(No Model.)

A. W. THOMAS.
WHEEL TIRE.

No. 399,355. Patented Mar. 12, 1889.

WITNESSES:
R. B. Shepherd.
Hermann Bormann.

INVENTOR.
Amos W. Thomas,
By J. Walter Douglass.
Atty.

UNITED STATES PATENT OFFICE.

AMOS W. THOMAS, OF PHILADELPHIA, PENNSYLVANIA.

WHEEL-TIRE.

SPECIFICATION forming part of Letters Patent No. 399,355, dated March 12, 1889.

Application filed June 30, 1888. Serial No. 278,640. (No model.)

*To all whom it may concern:*

Be it known that I, AMOS W. THOMAS, a citizen of the United States, residing at the city of Philadelphia, in the county of Philadelphia and State of Pennsylvania, have invented certain new and useful Improvements in Tires for the Wheels of Vehicles, of which the following is a specification.

My present invention relates to tires composed of elastic or compressible material made in tubular or other desirable form, and such as are susceptible of being inflated by causing air, gas, water, or other aeriform or gaseous fluids or liquids to be introduced into them.

My invention, generally speaking, is applicable to the road-wheels of carriages or other rolling conveyances, but more especially to the road-wheels of bicycles, tricycles, and velocipedes of all varieties.

The main object of my invention is to render more durable and serviceable the tires of the road-wheels of such rolling conveyances.

My invention consists of a tubular compressible tire made of rubber or other suitable material of a uniform thickness throughout, but with the portion constituting the tread thereof and opposite to that caused to engage with the rim or grooved felly of the wheel, which I term the "felly-facing portion," of tougher material than the latter portion, whereby a strong tire is presented, especially adapted for withstanding friction, abrasion, and rough usage of wear to which such tires are generally subjected in their many applications to the road-wheels of rolling conveyances.

The construction of such a tire may be effected in more than one way—for instance, it may be made of material having different densities or toughness. For example, if made of rubber, the tread portion thereof and the felly-facing portion may be each made of dough of rubber of different densities, so that one portion may be rendered tougher than the other after vulcanization.

In the accompanying drawings I have illustrated tires embodying the characteristic features of my invention, in which—

Figure 1:
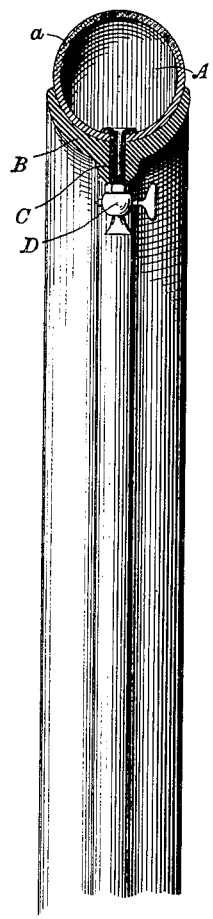
Figure 3:
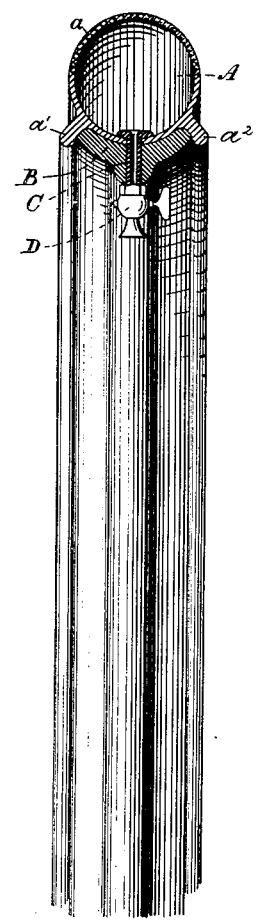
Figure 2:
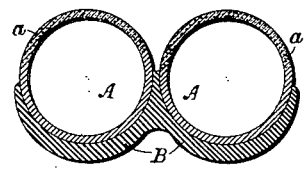

Figure 1 is a transverse sectional view of a tire embodying my invention as applied to a groove-faced metal felly of the character employed in bicycles, and which is shown partly in section and partly in elevation. Fig. 2 is a transverse section of two tires, each embodying the features of my invention and mounted side by side upon a felly having two grooves upon its outer face, to which the tires are respectively secured; and Fig. 3 is a transverse sectional view of a tire embodying a modified form of tire in application to a groove-faced metal felly, which is shown partly in section and partly in elevation.

Referring to the accompanying drawings for a further description of my invention, A is the tire formed of a continuous endless tube of rubber or other suitable material. $a$ is the tread portion thereof, which in the making of the tube is strengthened by the addition of material thereto that will give to the same when finished a tougher nature than the opposite portion, which is made to engage in the grooved face of the felly. The tire may be sprung into the concave groove of the felly B, and may be held solidly to place therein by means of cement or other glutinous or adhesive material.

In order to inflate the tire after having been secured to position in the groove of the felly, a tube, C, provided with a cock, D, may be fitted into an opening provided in the felly to receive it and passed through the same into the interior of the tire, and the liquid or fluid forced through the same for the inflation thereof.

It will be understood that the tire as a whole is fluid-tight, and after inflation will normally maintain its cylindriform contour, at the same time retaining the inflating medium. The degree of compressibility may be regulated by the degree of inflation or by the tension of the inflated medium, and which may be introduced under pressure.

I desire it to be understood that I do not confine myself to the use of rubber for the formation of the tire, yet nevertheless I give preference thereto for the purpose, owing to its suitability, and also from the standpoint of cheapness and economy.

In Fig. 2 are shown two tires, A A, suitably secured to a duplex metal or other felly, B B, with concave grooves in the face thereof. The tires A A, while made of a uniform thickness of material throughout, have the tread portions thereof made so as to be tougher than the opposite or felly-facing portions. The inflation of the hollow tires may be accomplished in this instance in the same manner as hereinbefore fully described.

In Fig. 3 is illustrated a further modification of my improved tire, having projections $a'$ and $a^2$ diverging slightly in opposite directions, and which are brought into engagement with the extremities of the grooved felly B, and held thereto by cement or in any other preferred manner. These projections thoroughly protect the extremities of the felly in the event of collapse of the tube composing the tire, due to leakage of the liquid or fluid by which it is inflated, thereby preventing the same from coming in contact with the ground, which would tend to retard the free or easy movement of the wheel.

The principal advantage of my invention is that a very strong, tenacious, tough, and durable tire is produced, capable in a most satisfactory manner of withstanding all friction, abrasion, and rough usage of wear incident to the use of tires, and especially in their connection with the road-wheels of bicycles and other analogous means of conveyance.

Having thus described the nature and objects of my invention, what I claim as new, and desire to secure by Letters Patent, is—

1. A hollow tire of rubber or other material of uniform thickness, but with the tread portion thereof made tougher than the felly-facing portion, substantially as and for the purposes set forth.

2. An inflatable tire of rubber or other material of uniform thickness, but with the tread portion thereof tougher than the felly-facing portion, and provided with projections, substantially as and for the purposes set forth.

3. An inflatable tire having the tread portion thereof made tougher than the felly-facing portion, in combination with a felly having said tire secured thereto, substantially as described.

In witness whereof I have hereunto set my signature in the presence of two subscribing witnesses.

AMOS W. THOMAS.

Witnesses:
W. A. WHITMORE,
GEO. W. REED.